United States Patent
Bortone et al.

(10) Patent No.: US 6,770,233 B2
(45) Date of Patent: Aug. 3, 2004

(54) FLAPPER ASSEMBLY FOR PRODUCING A CURLY PUFF EXTRUDATE

(75) Inventors: Eugenio Bortone, Frisco, TX (US); Edward Leon Ouellette, Corinth, TX (US)

(73) Assignee: Frito-Lay North America, Inc., Plano, TX (US)

( * ) Notice: Subject to any disclaimer, the term of this patent is extended or adjusted under 35 U.S.C. 154(b) by 36 days.

(21) Appl. No.: 10/271,118

(22) Filed: Oct. 15, 2002

(65) Prior Publication Data

US 2003/0047833 A1 Mar. 13, 2003

Related U.S. Application Data

(63) Continuation-in-part of application No. 09/952,574, filed on Sep. 10, 2001.

(51) Int. Cl.[7] .............................................. B29C 47/00
(52) U.S. Cl. .................... 264/167; 264/210.2; 425/320; 425/382.4
(58) Field of Search ............................. 264/167, 210.2, 264/40.5; 425/318, 320, 382.4

(56) References Cited

U.S. PATENT DOCUMENTS

| | | | | |
|---|---|---|---|---|
| 2,456,304 A | * | 12/1948 | Morin | 264/171.2 |
| 3,847,531 A | * | 11/1974 | McComb | 425/464 |
| 3,922,455 A | * | 11/1975 | Brumlik | 428/85 |
| 3,932,090 A | * | 1/1976 | Brumlik | 425/381 |
| 4,097,213 A | | 6/1978 | McComb et al. | |
| 4,198,734 A | * | 4/1980 | Brumlik | 24/449 |
| 4,288,463 A | | 9/1981 | Groff et al. | |
| 4,290,989 A | | 9/1981 | Topor et al. | |
| 4,504,511 A | * | 3/1985 | Binley | 426/565 |
| 4,525,369 A | * | 6/1985 | Fowler | 426/446 |
| 4,698,004 A | | 10/1987 | Ramnarine | |
| 4,756,921 A | * | 7/1988 | Calandro et al. | 426/560 |
| 4,803,091 A | | 2/1989 | Mottur et al. | |
| 4,867,667 A | * | 9/1989 | Moriyama | 425/190 |
| 4,888,192 A | | 12/1989 | Ramnarine | |
| 5,641,529 A | | 6/1997 | Kunas | |
| 5,776,534 A | * | 7/1998 | Christensen et al. | 426/516 |
| 5,888,567 A | | 3/1999 | Daouse | |
| 6,086,352 A | | 7/2000 | McFarland | |
| 6,365,080 B1 | * | 4/2002 | Parise | 264/167 |

* cited by examiner

Primary Examiner—Mark Eashoo
(74) Attorney, Agent, or Firm—Colin P. Cahoon; Carstens, Yee & Cahoon, L.L.P.

(57) ABSTRACT

An improved method of applying a controlled pressure to the flapper in a curly puff production apparatus. The present invention uses a pneumatic system to apply a pressure to a flapper. The invention utilizes a rotary actuator that applies a near constant pressure to the flapper. Alternatively, a pair of telescoping tubes connected to the flapper and an air pressure source can apply a near constant pressure to either the proximate end or the distal end of the flapper. Further in the alternative, a linear actuator can be used to provide a near constant pressure to the flapper. As a result of applying a constant pressure to the flapper, the pitch in the curls of the curly puff extrudate can be more predictably controlled.

25 Claims, 8 Drawing Sheets

FLAPPER ASSEMBLY FOR PRODUCING A CURLY PUFF EXTRUDATE

CROSS-REFERENCE TO RELATED APPLICATION

The present application is a continuation-in-part of U.S. patent application Ser. No. 09/952,574 filed Sep. 10, 2001 entitled "Apparatus and Method for Producing Curly Puff Extrudate".

BACKGROUND OF THE INVENTION

1. Technical Field

The present invention relates to the production of a spiral shaped puff extrudate and, in particular, to an improved apparatus and method of confining the extrudate in a tube or like peripheral containment vessel while applying a force or resistance on the extrudate downstream of the extrudate's glass transition point. The downstream force or resistance causes the otherwise linear extrudate to "back-up" into the containment vessel, thus coiling into the spiral or curl shape.

2. Description of Related Art

The production in the prior art of a puffed extruded product, such as snacks produced and marketed under the Cheetos™ brand label, typically involves extruding a corn meal or other dough through a die having a small orifice at extremely high pressure. The dough flashes or puffs as it exits the small orifice, thereby forming a puff extrudate. The typical ingredients for the starting dough may be, for example, corn meal of 41 pounds per cubic foot bulk density and 12 to 13.5% water content by weight. However, the starting dough can be based primarily on wheat flour, rice flour, soy isolate, soy concentrates, any other cereal flours, protein flour, or fortified flour, along with additives that might include lecithin, oil, salt, sugar, vitamin mix, soluble fibers, and insoluble fibers. The mix typically comprises a particle size of 100 to 1200 microns.

Figures 1, 2, 3:
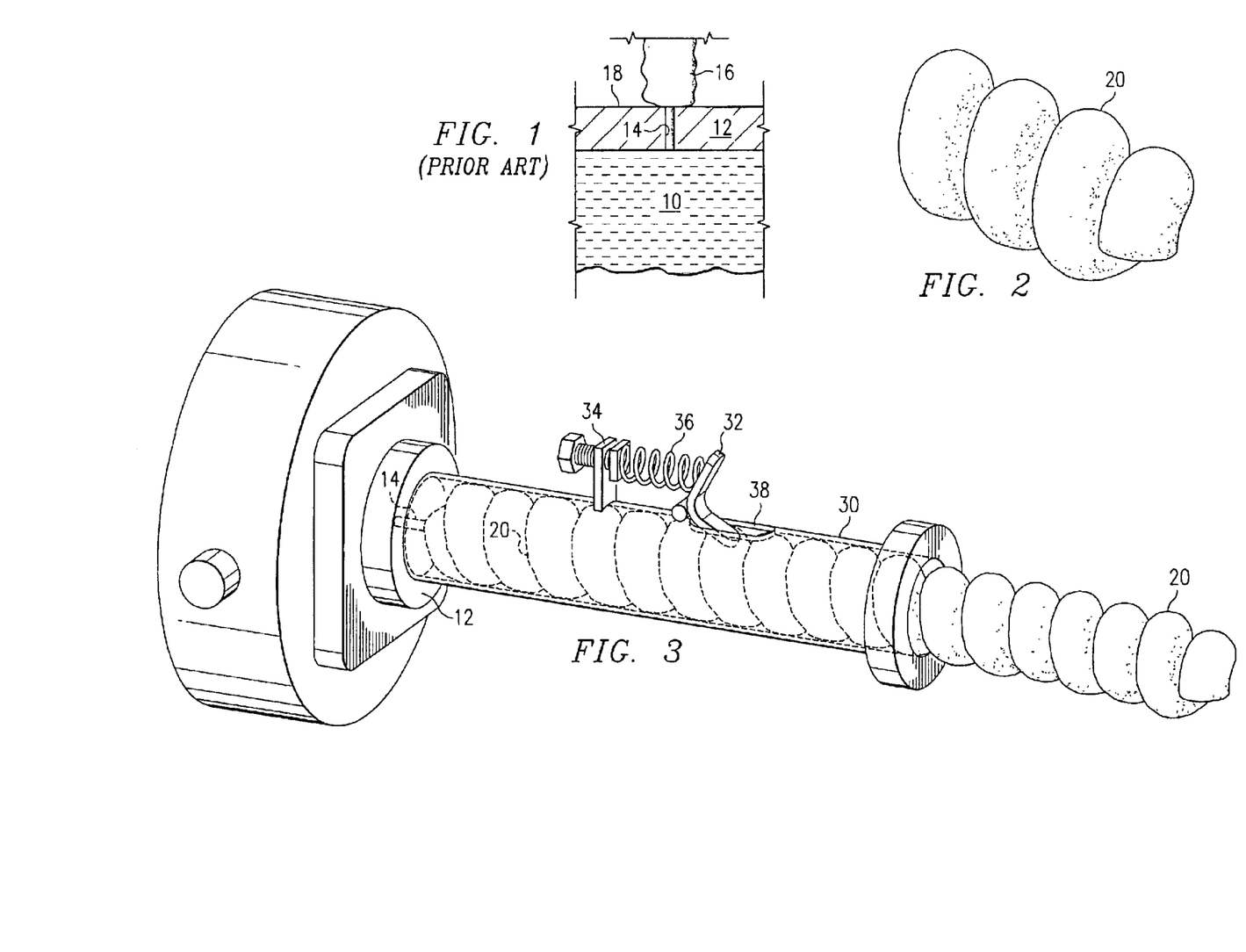
FIG. 1 is a schematic cross-section of a prior art puff extrudate die.
FIG. 2 is a perspective view of one embodiment of the desired puff extrudate product.
FIG. 3 is a perspective view in elevation of one embodiment of the present invention.

The puff extrusion process is illustrated in FIG. 1, which is a schematic cross-section of a die 12 having a small diameter exit orifice 14. In manufacturing a corn-based puffed product, corn meal is added to, typically, a single (i.e., American Extrusion, Wenger, Maddox) or twin (i.e., Wenger, Clextral, Buhler) screw-type extruder such as a model X 25 manufactured by Wenger or BC45 manufactured by Clextral of the United States and France, respectively. Using a Cheetos like example, water is added to the corn meal while in the extruder, which is operated at a screw speed of 100 to 1000 RPM, in order to bring the overall water content of the meal up to 15% to 18%. The meal becomes a viscous melt 10 as it approaches the die 12 and is then forced through a very small opening or orifice 14 in the die 12. The diameter of the orifice 14 typically ranges between 2.0 mm and 12.0 mm for a corn meal formulation at conventional moisture content, throughput rate, and desired extrudate rod diameter or shape. However, the orifice diameter might be substantially smaller or larger for other types of extrudate materials.

While inside this small opening 14, the viscous melt 10 is subjected to high pressure and temperature, such as 600 to 3000 psi and approximately 400° F. Consequently, while inside the small orifice 14, the viscous melt 10 exhibits a plastic melt phenomenon wherein the fluidity of the melt 10 increases as it flows through the die 12.

It can be seen that as the extrudate 16 exits the orifice 14, it rapidly expands, cools, and very quickly goes from the plastic melt stage to a glass transition stage, becoming a relatively rigid structure, referred to as a "rod" shape if cylindrical, puffed extrudate. This rigid rod structure can then be cut into small pieces, further cooked by, for example, frying, and seasoned as required.

Any number of individual dies 12 can be combined on an extruder face in order to maximize the total throughput on any one extruder. For example, when using the twin screw extruder and corn meal formulation described above, a typical throughput for a twin extruder having multiple dies is 2,200 lbs., a relatively high volume production of extrudate per hour, although higher throughput rates can be achieved by both single and twin screw extruders. At this throughput rate, the velocity of the extrudate as it exits the die 12 is typically in the range of 1000 to 4000 feet per minute, but is dependent on the extruder throughput, screw speed, orifice diameter, number of orifices and pressure profile.

As can be seen from FIG. 1, the snack food product produced by such process is necessarily a linear extrusion which, even when cut, results in a linear product. Consumer studies have indicated that a product having a similar texture and flavor presented in a "curl," "spiral," or "coil spring" shape (all of which terms are used synonymously by Applicant herein) would be desirable. An example of such spiral shape of such extrudate is illustrated in FIG. 2, which is a perspective view of one embodiment of a spiral or curl shaped puffed extrudate 20. The embodiment illustrated in FIG. 2 is an extrudate with a relatively tight pitch, short diameter, and cut at approximately four turns or spirals. It should be understood that when referring to a curl, spiral, or coil spring shaped puffed extrudate, however, Applicant intends that the pitch (which can be a left hand or right hand pitch) and diameter of the curl or spiral in addition to the rod (or other shape) diameter and piece length can each vary independently to provide a wide variety of products. Unfortunately, the high volume process described above provides unique challenges in producing such shape 20.

The usual method for imparting a spiral shape in an extrudate, such as with spiral shaped pasta, involves forcing the dough through a spiral shaped die orifice. As can be readily understood, such solution would not work with a puffed product that is in a plastic melt stage inside the die and produced at the velocity described above, since the product would have no memory of the imparted spiral shape upon exiting the die. In fact, it has been found that it is extremely difficult to meaningfully manipulate the melt as it passes through the die in order to induce an extrudate to wind in free space, by, for example, a temperature differential from one side of the die to the other, without substantially reducing the flow rate of the melt through the die.

Another prior art method for imparting twists or curls in the dough involves using an extruder with rotating nozzles. This process, however, is only viable when the extrudate retains a very pliable form. Further, extrusion by way of rotating nozzles typically, again, requires a greatly reduced throughput rate as compared with the relatively high volume production desirable with the prior art linear products.

To further complicate the matter, a larger surface area is required on the extruder face for the same number of individual dies when extruding a curled product versus a linear product, since the space between each die as between a linear product and a curled product must necessarily be increased to allow for the diameter of the spiral. By way of example, an extruder face may under prior art conditions accommodate 28 individual dies running at 80 lbs. per hour per each die, thereby producing a 2,240 lb. per hour throughput for the entire extruder. In order to theoretically produce the curl shaped extrudate 20 shown in FIG. 2, the same extruder face might only accommodate, for example, 4 individual dies. By way of further example, if it is necessary to slow the throughput rate to less than 30 lbs. per hour per die in order to impart some spiral shape on the extrudate by manipulating the melt inside the die, this reduces the total throughput for that extruder to only 120 lbs. per hour. Thus, by converting an extruder to manipulate the melt inside the die and imparting a spiral shape, the extruder maintains only about 5% of the throughput rate as compared to the standard linear production, even though the throughput for each individual die is reduced to about 38% of the previous throughput rate. The problem becomes even more pronounced if the extrudate throughput is reduced to even lower levels.

It can be easily understood that any prior art solution that requires the substantial reduction in the throughput of the extrudate, therefore, is not an acceptable alternative when, for example, twenty extruders must be used to match the throughput of a single extruder when compared with a linear production line. Forcing the extrudate into some spiral shaped former upon exiting the die is also not practical due to the brittle consistency of the extrudate after it drops below its glass transition temperature. Also, such spiral shaped former could become easily clogged, thereby requiring stopping the entire production line.

Consequently, a need exists for developing a method and apparatus that can impart a spiral or curl shape in a puff extrudate while also maintaining an efficient throughput rate of the product through the extruder. Ideally, such invention should be readily adaptable to existing extruders and dies, require little or minimal modification to such equipment, allow for traditional face cutting, and introduce as few collateral processing issues as possible when integrated into the overall production line.

Furthermore, the production of curly puff extrudate 20 has proved to be especially strenuous on the production equipment. The extrudate 16 is typically in excess of 150° F. and releases a large amount of steam and other hot gasses, which are very corrosive on the seals and other parts in the flapper assembly. To further complicate the matter, the overall outside diameter of the curly puff extrudate 20 may vary and can be traveling as fast as several hundred feet per minute, which produces a considerable amount of vibration on the equipment. The friction from this vibration deteriorates any moving parts involved. Therefore, a need exists for an apparatus that contains relatively few moving parts that is able to withstand the strenuous vibrations and operating conditions of curly puff extrudate production. Moreover, it is desirable to be able to control and predictably alter the pitch of the spirals in the curly puff extrudate 20.

SUMMARY OF THE INVENTION

The proposed invention comprises introducing the extrudate as it exits the extruder die into a containment tube or other peripheral containment vessel that is generally axially oriented with the flow path of the extrudate and has a diameter that approximates the intended diameter of each curl. A slight pressure, force, or resistance is then applied on the extrudate downstream of the glass transition point. This resistance causes the extrudate to "back up" and, in essence, coil inside the peripheral containment vessel.

The resistance can be accomplished by any number of device. For example, a blocking element can be placed in front of the containment tube, either outside of or integral to the tube. A hole can be drilled in the containment tube and either a pressure applied or a vacuum applied through such hole, either of which need only be of such magnitude to effect a change in the resistance on the extrudate sufficient to begin the coiling process. A blocking flap under spring tension can also be used, or any number of small obstructions or device of applying a force on the extrudate.

Such a device can be easily fitted to the exit of an extruder die at one end and to a circular extruder face at the other end, thereby allowing for a simple and inexpensive retrofit to existing machinery and allowing for face cutting. Changes in the containment vessel and changes in the method of applying resistance can be used to adjust the pitch and diameter of the curl. Economically high throughput rates can be achieved, thus allowing for efficient utilization of existing extruder production lines without requiring additional extruders to maintain line production rates.

An additional improvement is an apparatus that can control the pressure applied to the extrudate by the flapper. Controlling the pressure applied by the flapper allows the invention to control the pitch of the curls in the curly puff extrudate. The improved flapper apparatus also removes the more sensitive parts of the flapper apparatus from the heat, steam, and other harsh conditions of the extrudate and tube. In this manner the flapper can still be used to produce curly puff extrudate while the flapper parts enjoy increased longevity.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

FIG. 3 is a perspective view in elevation of one embodiment of the invention which also shows the extrudate 20 in phantom inside the containment tube 30. Corresponding reference numerals are used to represent corresponding elements throughout the figures shown in this application unless otherwise indicated.

The extrudate 20 exits the small orifice 14 of the die 12 in the same manner as described in the prior art. Again, the diameter of the orifice 14 is dependent on the specific dough formulation, throughput rate, and desired rod (or other shape) diameter, but is preferred in the range of 1 mm to 14 mm. (The orifice 14 diameter is also dependent on the mean particle size of the corn meal or formula mix being extruded.) The tube 30 is shown centered over the orifice 14 and axially oriented with the extrudate flow. However, it should be understood that the tube 30 could be off-center from the orifice 14 and canted some degrees from an axial orientation. It should also be understood that the orifice 14 need not be circular, but could be any number of shapes, such as star shaped, hexagonal, square, etc . . .

If no force or resistance were applied to extrudate 16, it would proceed down the length of the containment tube 30 in a straight rod or linear formation, as with the prior art. However, in the embodiment shown in FIG. 3, a spring loaded flapper 32 provides a slight, and oscillating, resistance on the extrudate 20 at some point downstream of the glass transition point for the extrudate 16. As used herein, the glass transition point is that point where the extrudate turns from a liquid or plastic phase to solid or glassy phase after puffing out of the orifice 14, thereby resulting in a relatively brittle end product. The glass transition point is generally very close to the exit of the orifice 14, and is certainly within a few millimeters of such point during the production of the example corn products previously described herein. This slight resistance applied downstream of the glass transition point causes the extrudate 20 to seek the path of least resistance and begin backing up into the containment tube 30 until forming the coils illustrated, thereby adapting the circular shape of the containment tube 30. Consequently, the velocity of the curly puff extrudate 20 in the direction of tube 30 opening is reduced.

The pitch of the spiral can be controlled by adjusting the force applied on the extrudate by the flapper 32. In the embodiment shown, this is accomplished by an adjustment device 34 which controls the tension on a spring 36. The spring 36, which can be a compression spring, extension spring or any number of actuators, both mechanical and electrical, in turn pushes the flapper 32 into a cavity 38 cut into the containment tube 30.

The flapper 32 arrangement with the cavity 38 provides the additional benefit of allowing exhausting of excess water or steam out of the containment tube 30. Further, the spring loaded flapper 32 provides a device for applying resistance to the curly puff extrudate 20 while also allowing for clearing of the containment tube 30 in the event of excess extrudate buildup.

As with the other embodiments shown, the diameter of the tube 30 can vary depending on the diameter of the curl that is desired. Typically, an inside diameter of the tube 30 between 0.5 inch and 4 inch is preferable. The length of the tube 30 is not critical, as long as it allows for the application of the resistance described sufficiently downstream of the glass transition point to produce the coiling effect. Tubes having an overall length of 0.75 inch to 12 inches have been found to be acceptable.

Figure 4:
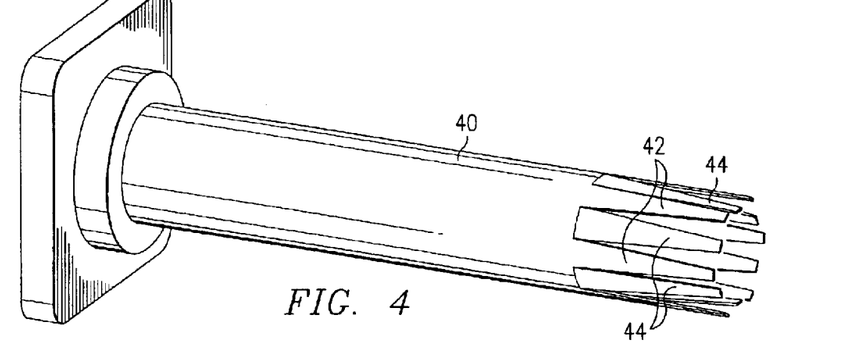
FIG. 4 is a perspective view in elevation of an alternative embodiment of the present invention.

Another embodiment of the present invention is found in FIG. 4, which shows a containment tube 40 with alternating tines 42, 44 at the exit end of the tube 40. Half of the tines 42 are merely parallel extensions of the tube 40. The other half of the tines 44 are bent slightly inward, thereby providing the resistance necessary to begin the curling of the extrudate within the containment tube 40.

Figure 5:
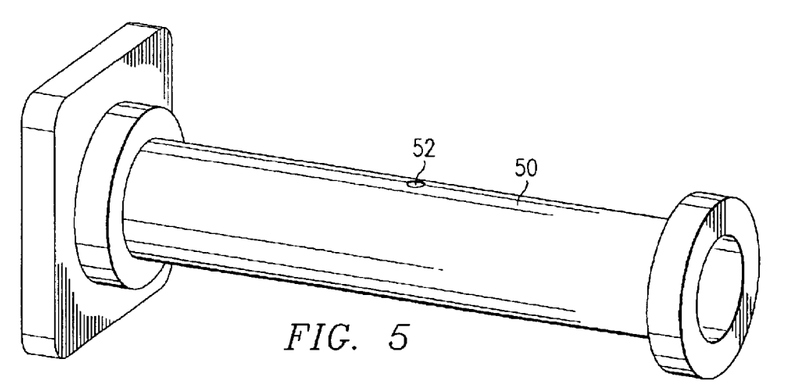
FIG. 5 is a perspective view in elevation of an alternative embodiment of the invention.

FIG. 5 shows another embodiment of the present invention incorporating a small orifice 52 cut into the containment tube 50. Pressurized air or, alternatively, a vacuum may be introduced at the orifice 52. The differential pressure thereby produced is sufficient to again cause enough resistance within the containment tube 50 to cause the extrudate to curl within the tube 50. For example, at a throughput rate of 300 lbs. per hour using a die orifice diameter of 2.0 mm and containment tube 50 diameter of 1 inch, the introduction of a pressure in the range of 5 to 100 psig or a vacuum in the range of −0.5 torr to −258.5 torr have both been found effective in producing the desired phenomenon.

Figure 6:
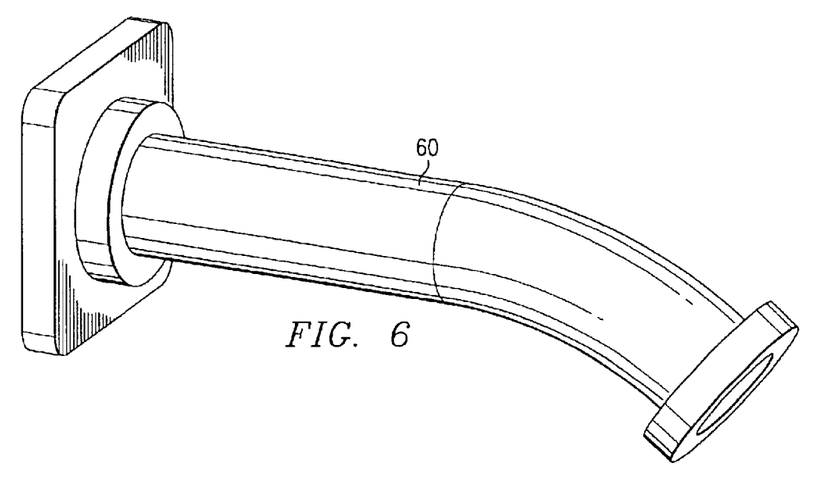
FIG. 6 is a perspective view in elevation of an alternative embodiment of the invention.

FIG. 6 shows another alternative embodiment to the proposed invention involving a curved containment tube 60. The curve or bend found downstream on the containment tube 60 again creates the desired resistance on the extrudate required to begin the curling within the containment tube 60. Depending on the throughput rate of the extrudate and the physical proportions of the extrudate, a curve in the containment tube of anywhere from 2° to 90° has been demonstrated to produce the desired effect. The same effect can be achieved using a straight tube axially canted slightly from the extrudate flow path, such that the initial contact of the extrudate with the inner wall of the tube provides the resistance required.

It should be understood that the various embodiments shown in FIGS. 3–6 are provided merely as examples of device by which a downstream resistance or pressure can be applied to the extrudate while such extrudate is bound by a containment tube or other peripheral containment vessel. Any number of shapes of containment vessels can be used, such as a containment vessel having rectangular, square, oval, or triangular sidewalls as opposed to a circular tube. The use of a square or triangular containment vessel typically produces a spiral similar to that produced by a round containment vessel. An oval containment vessel can produce a curled product that generally adopts the overall oval shape of the vessel. The containment vessel need not be a continuous enclosure. For instance, it can also consist of a plurality of members, such as rod shaped members, which generally form the skeleton or wire frame shape of a continuous-walled containment vessel, such as a pipe.

It should be understood that using the same principles previously disclosed, a rectangular containment vessel can be used having a width only slightly larger than the diameter of the extrudate to produce a sinusoidal shaped extrudate as opposed to a curly extrudate. When a resistance is applied to an extrudate in such containment vessel, a sinusoidal shape is formed, as the extrudate oscillates back and forth within the narrow rectangular shape. The wavelength of this sinusoidal shape can be varied depending on the resistance applied and the velocity of the extrudate. The height or amplitude of the sinusoidal shape is approximately one-half the interior height of the rectangular containment vessel.

Regardless of the shape of the containment vessel used, any number of device of applying the resistance can also be used, including the introduction of any physical resistance or any other device to redirect the extrudate stream sufficient to cause the extrudate to back up inside the containment tube or peripheral containment vessel. An area of increased resistance in a straight tube, for example, could produce the desired effect. The resistance need not be applied from a point within the containment vessel, but can be applied outside the containment vessel as well.

It has been found that traditional throughput rates through existing dies may be maintained using any of the embodiments illustrated and discussed above. In fact, throughput rates in excess of traditional extrusion throughputs, for example in the range of 400 lbs. per hour through a 2.0 mm diameter die, have been achieved while still maintaining the continuous curls flowing from each containment tube. Consequently, a lesser number of extruder dies can be used to accommodate the spiral diameter while still maintaining an effective throughput rate when a number of dies are used in combination or series along an extruder face.

Figure 7:
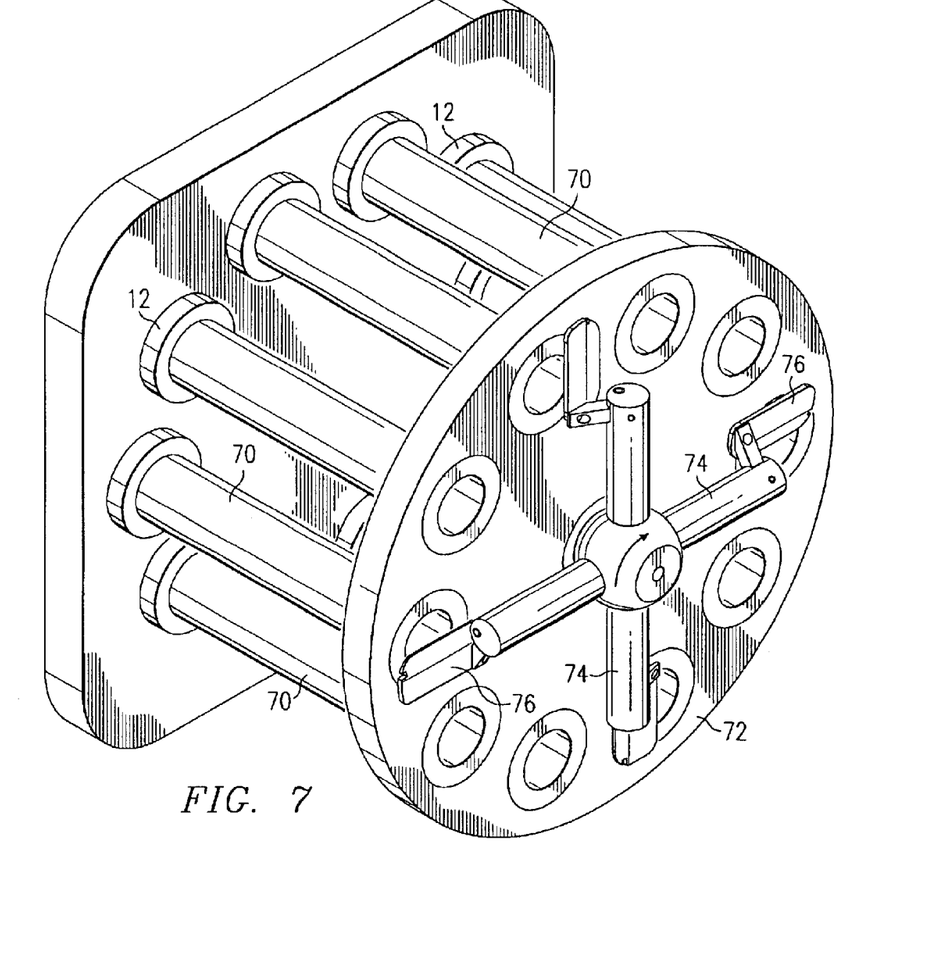
FIG. 7 is a perspective view in elevation of an embodiment of the invention incorporated into a multiple die and circular face cutting arrangement.

FIG. 7 illustrates a perspective view of one embodiment of the invention involving a number of dies 12 in series attached to a number of containment tubes 70. The exit end of each containment tube 70 is attached to an extruder face 72. This arrangement then permits the attachment to the extruder face of a circular cutting apparatus 74 having a number of individual cutting blades 76. Such an arrangement is shown with ten individual extruder dies 12 connected to ten containment tubes 70, and permits overall throughput rates through the extruder equal to the throughput rates previously described for prior art puffed rod production using the methods described above.

Although not shown in FIG. 7, the containment tube 70 and extruder face 72 configuration can be designed such that the dies 12 are allowed to vent until specific conditions are met (such as extrudate bulk density, specific mechanical energy, moisture content, screw speed, and die pressure), then the containment tube 70 can be rotated over the dies 12 by device of an additional rotatable plate (not shown) between the tubes 70 and the dies 12.

Figure 8:
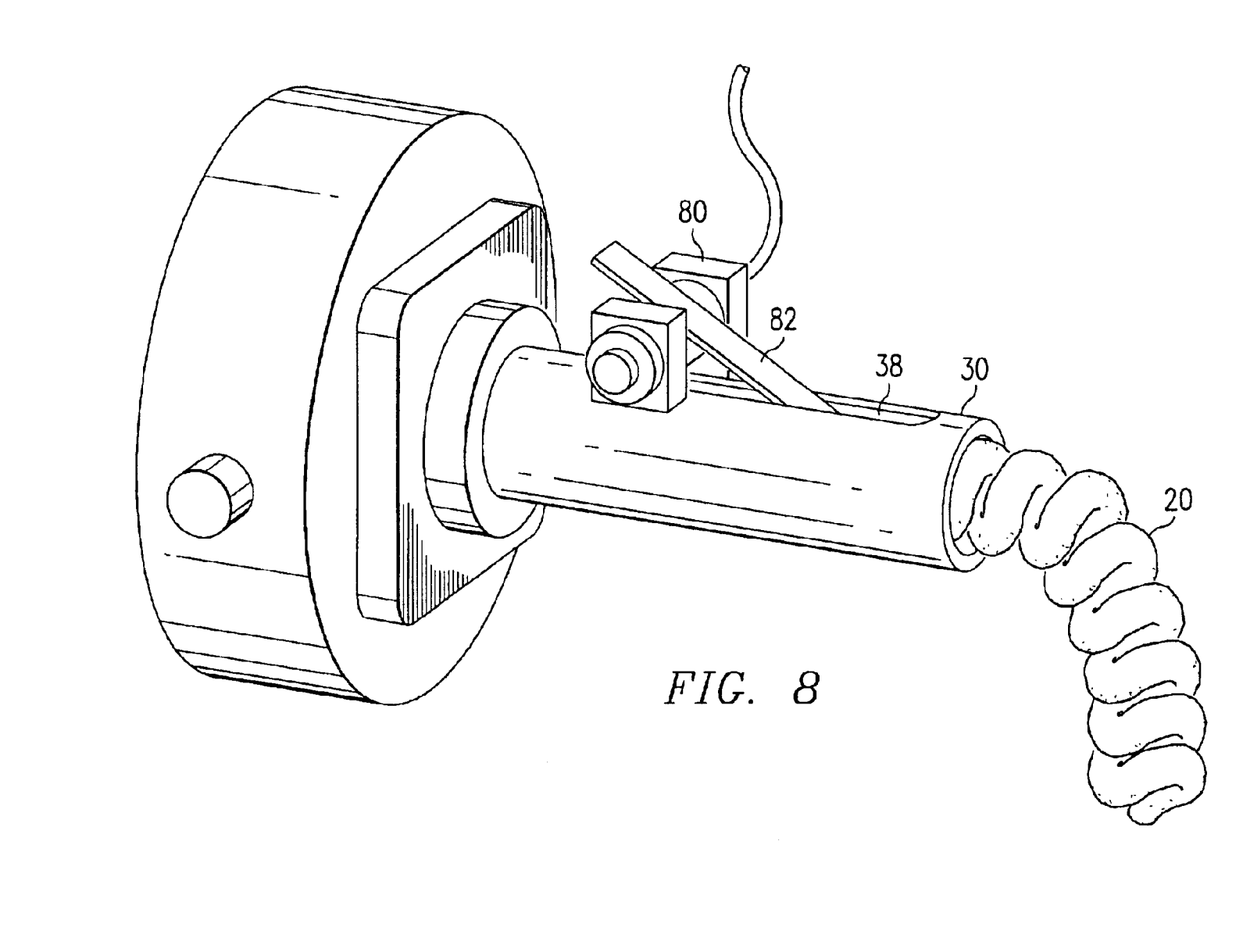
FIG. 8 is a perspective view in elevation of one embodiment of the present invention.

FIG. 8 is an illustration of a flapper assembly utilizing a rotary actuator 80. The flapper 82 is connected at the proximate end (in relation to the die) to a rotary actuator 80, which is able to position the flapper 82 within the containment tube 30 and apply a near constant pressure upon the flapper 82. A stainless steel, Teflon-coated flapper 82 with a thickness between 0.008" and 0.012" has been found to be acceptable for the curly puff extrudate 20 production described herein because the flapper 82 is flexible enough not to plug the containment tube 30 when the curly puff extrudate 20 surges. A pressure control valve (not shown) regulates the air pressure applied to the flapper 82, and consequently, the pressure applied to the curly puff extrudate 30. The pressure control valve is capable of keeping a near constant pressure on the flapper 82. An engagement switch or joystick (not shown) lowers the flapper 82 through the cavity 38 into the containment tube 30, and raises the flapper 82 out of the containment tube 30. Optional position indicators can be installed to indicate the actual position of the flapper 82 inside the containment tube 30, if desired. A rotary actuator 80 manufactured by the Festo Corporation of Hauppauge, N.Y. (part number DSM/6/180/P/A) is, suitable for the application described herein.

When using the rotary actuator flapper assembly as described herein, the desired flapper 82 pressure is set using the pressure control valve and the joystick is used to lower the flapper 82 through the cavity 38 into the containment tube 30. Using this control apparatus, an air pressure between 20 psig and 100 psig produces the curly puff extrudate 30 similar to that described herein. It should be understood that the joystick and pressure control valve are not the only way to control the flapper pressure and other control methods are known by persons skilled in the art. When the flapper 82 is lowered far enough into the containment tube 30 to apply pressure to the extrudate 16, the extrudate 16 will curl and form the curly puff extrudate 30. The flapper 82 is then repositioned as necessary to control the pitch of the curls of the curly puff extrudate 30. Although not shown, the rotary actuator 80 can be mounted on a frame so that the flapper assembly is independent of the containment tube. In this manner, the flapper assembly can be removed and replaced without interfering with the containment tube 30 or stopping the extrusion process. When multiple containment tubes 30 are used on the same die 12, the embodiment in FIG. 8 is preferable because it is small and compact and does not take up an excess amount of space near the die 12.

In some applications, it may not be preferable to use a rotary actuator 80 to control the flapper pressure. For example, a high throughput rate of curly puff extrudate 30 tends to vibrate the flapper 82 thousands of times per hour. These vibrations can quickly wear out the internal seals in the rotary actuator 80. Therefore, an alternative embodiment of the invention illustrated in FIGS. 9 and 10 can be used.

Figure 9:
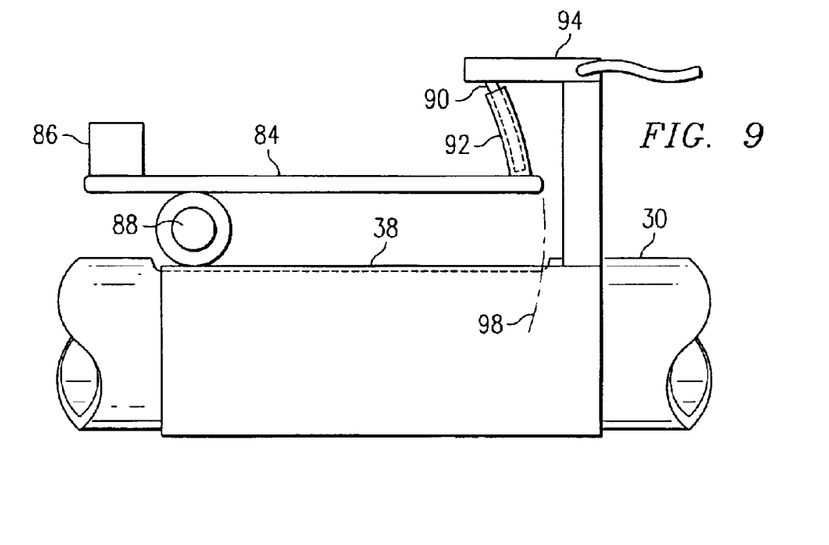
FIG. 9 is a side elevation view of one embodiment of the present invention.
Figure 10:
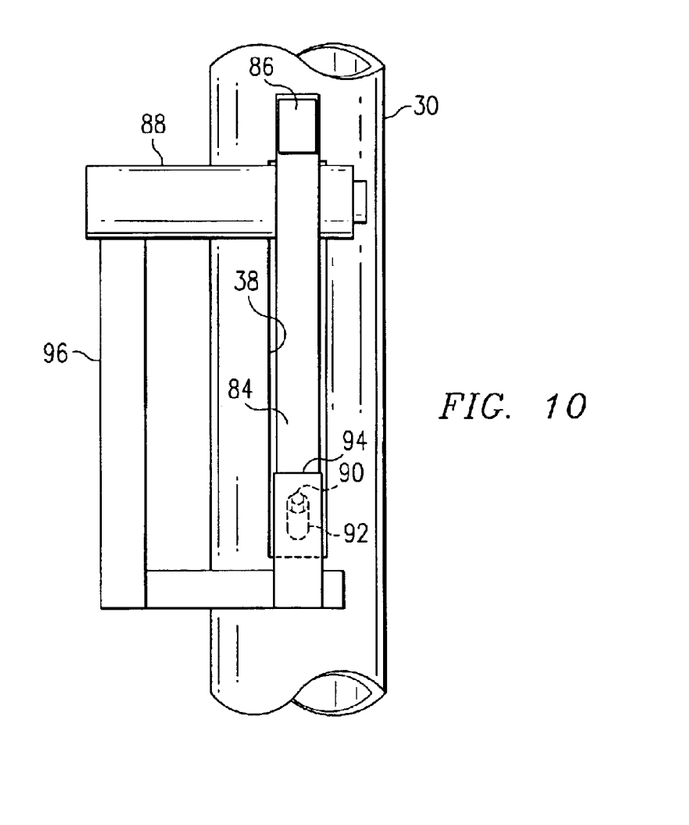
FIG. 10 is a plan view of an alternative embodiment of the present invention.

FIG. 9 is an example of the invention with a telescoping tube actuator at the distal end (in relation to the die) of the flapper 84. FIG. 10 is a plan view of the same embodiment of the invention. The rotating flapper assembly pivots about a pin 88. The flapper assembly of this alternative embodiment of the invention contains an outer tube 92 that has an inside diameter that is slightly larger that the outside diameter of the inner tube 90 such that the inner tube 90 telescopes within the outer tube 92. The outer tube 92 typically has an inside diameter of 4–8 mm. The inner tube 90 and the outer tube 92 are also curved to be concentric with the flapper radius 98 so that the two tubes form part of a circular arc with the flapper pin 88 as the circle's center. Thus, when the flapper 84 is lowered into the containment tube 30 through the cavity 38, the flapper 84 can be moved into any position inside the containment tube 30 and the inner tube 90 and the outer tube 92 will freely telescope and not bind in the rotational movement of the flapper 84. Alternatively, the telescoping tubes may be hinged or similarly connected to the flapper 84 or constructed out of a flexible material so that the tubes do not have to form part of a circular arc with the pin 88 at the circle's center. Further in the alternative, the telescoping tubes could be connected to the proximate end of the flapper 84 and the injection port 94 could apply a vacuum instead of a positive pressure. The telescoping inner tube 90 and outer tube 92 allow the injection port 94 to apply a near constant pressure to the distal end of the flapper 84 and control the pitch of the curls in the curly puff extrudate 30 in a manner similar to the flapper 82 and the rotary actuator 80. A counterweight 86 is attached to the proximate end of the flapper 84 so that the flapper 84 will rotate out of the containment tube 30 when the injection port 94 is not providing any air pressure to the flapper 84. Optional position indicators can be installed to indicate the actual position of the flapper 84 inside the containment tube 30, if desired. The entire flapper assembly is mounted on a frame 96, which is independent of the containment tube 30 such that the flapper assembly can be removed and replaced without interfering with the containment tube 30 or stopping the extrusion process. The embodiment illustrated in FIGS. 9 and 10 is beneficial because there is little surface-to-surface contact between parts, which produces less friction in high-vibration environments.

Figure 11:
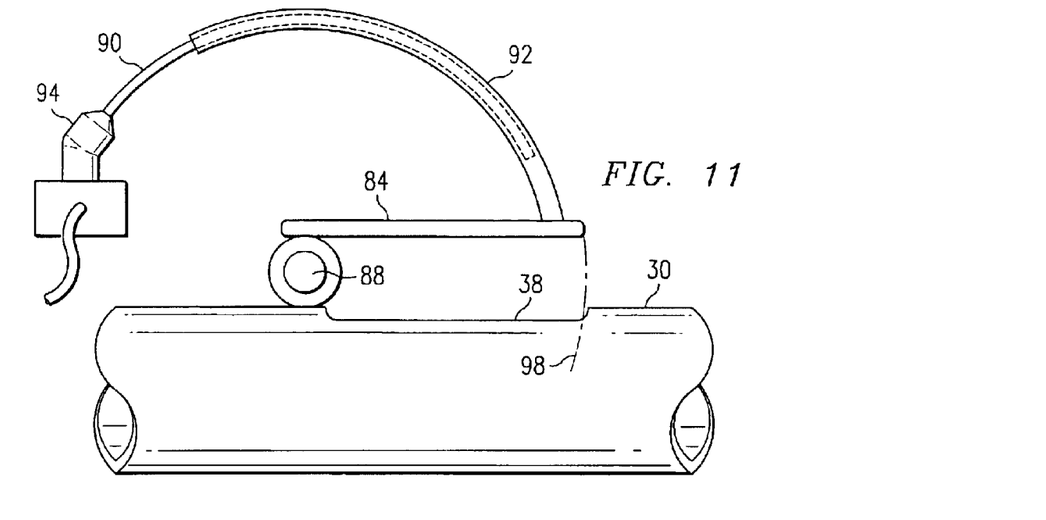
FIG. 11 is a side elevation view of an alternative embodiment of the present invention.
Figure 12:
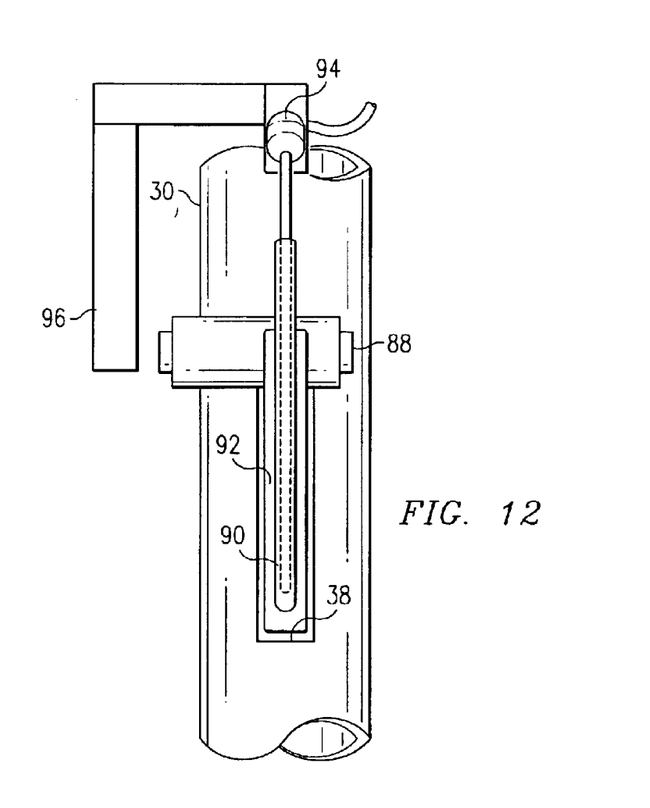
FIG. 12 is a plan view of an alternative embodiment of the present invention.

In some applications, it may be preferable or necessary to locate the injection port 94 at the proximate end of the flapper 84 as seen in an alternative embodiment of the invention in FIGS. 11 and 12. As with the embodiment in FIGS. 9 and 10, this alternative embodiment utilizes a pair of telescoping tubes to apply pressure to the distal end of the flapper 84. Again, the outer tube 92 has an inside diameter that is slightly larger that the outside diameter of the inner tube 90. The inner tube 90 and the outer tube 92 are also curved to be concentric with the flapper radius 98 so that they form part of a circular arc that is concentric with the flapper pin 88. In this manner, when flapper 84 is lowered into the containment tube 30 through cavity 38, the flapper 84 can be moved into any position inside the containment tube 30 and the inner tube 90 and the outer tube 92 will freely telescope and not bind in the rotational movement of the flapper 84. Alternative y, the telescoping tubes may be hinged or similarly connected to the flapper 84 or constructed out of a flexible material so that the tubes do not have to form part of a circular arc with the pin 88 at the circle's center. Further in the alternative, the injection port 94 and telescoping tubes could be connected to the proximate end of the flapper. The telescoping inner tube 90 and outer tube 92 allow the injection port 94 to apply a near constant pressure to the distal end of the flapper 84 and control the pitch of the curls in the curly puff extrudate 30 in a manner similar to flapper 82 and the rotary actuator 80. Although not shown in FIGS. 11 and 12, an optional counterweight 86 may be disposed at the proximate end of the flapper 84 so that the flapper 84 will position itself outside the containment tube 30 when the injection port 94 is not providing any air pressure to the telescoping tubes. Optional position indicators can be installed to indicate the actual position of the flapper 84 inside the containment tube 30, if desired. The entire assembly of the alternative embodiment is mounted on a frame 96 independent of the containment tube 30 assembly such that the flapper assembly can be removed and replaced without interfering with the containment tube 30 or stopping the extrusion process.

Figure 13A:
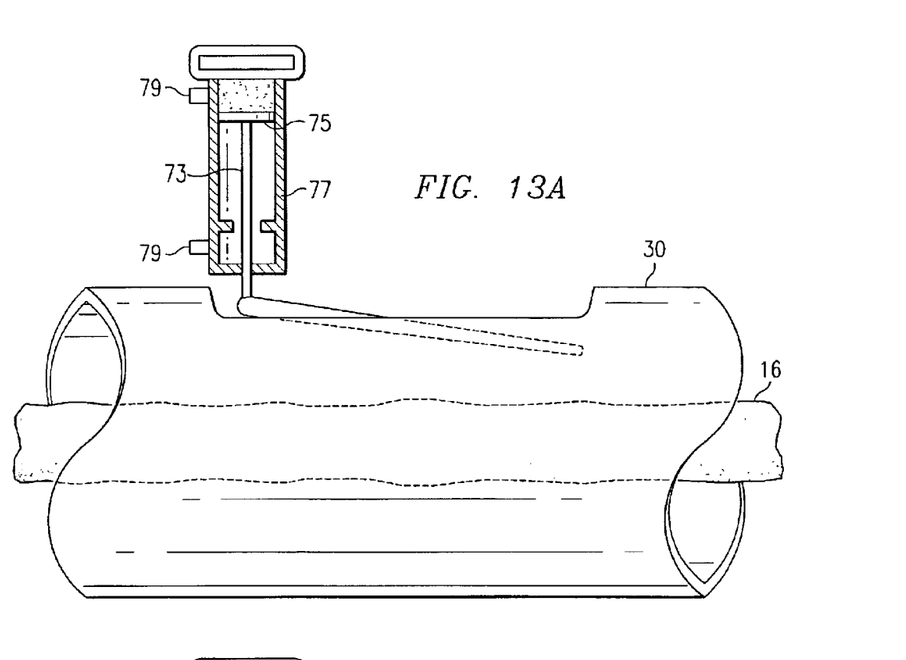
FIGS. 13A and 13B are side elevation views of an alternative embodiment of the present invention.
Figure 13B:
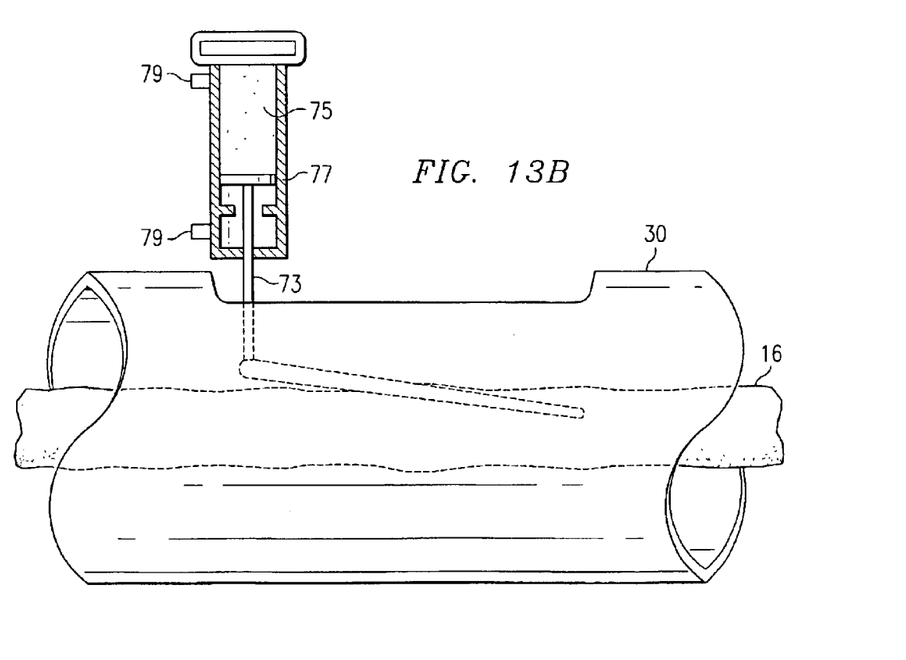
Figure 14A:
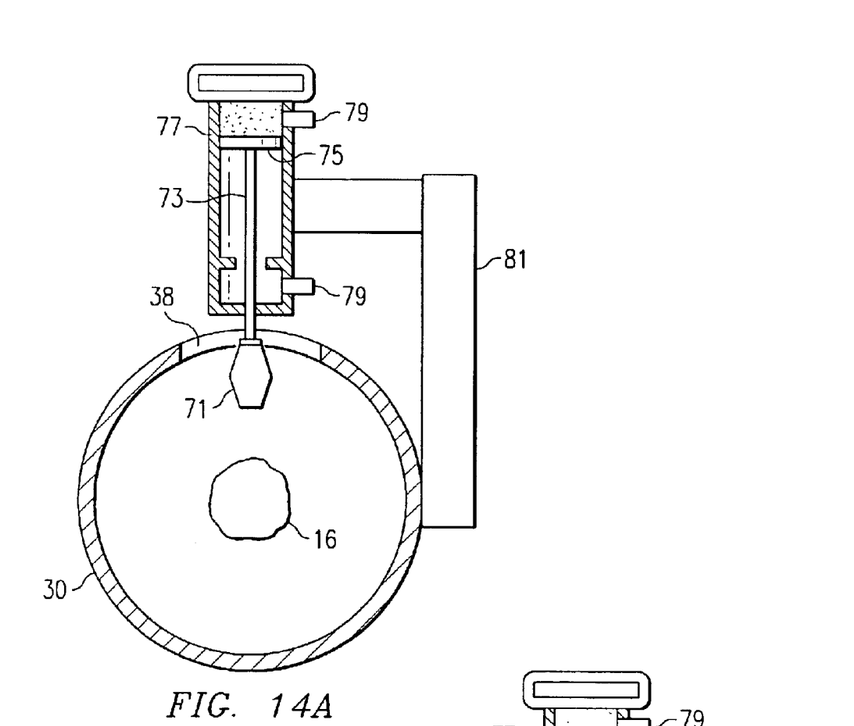
FIGS. 14A and 14B are front elevation views of an alternative embodiment of the present invention.
Figure 14B:
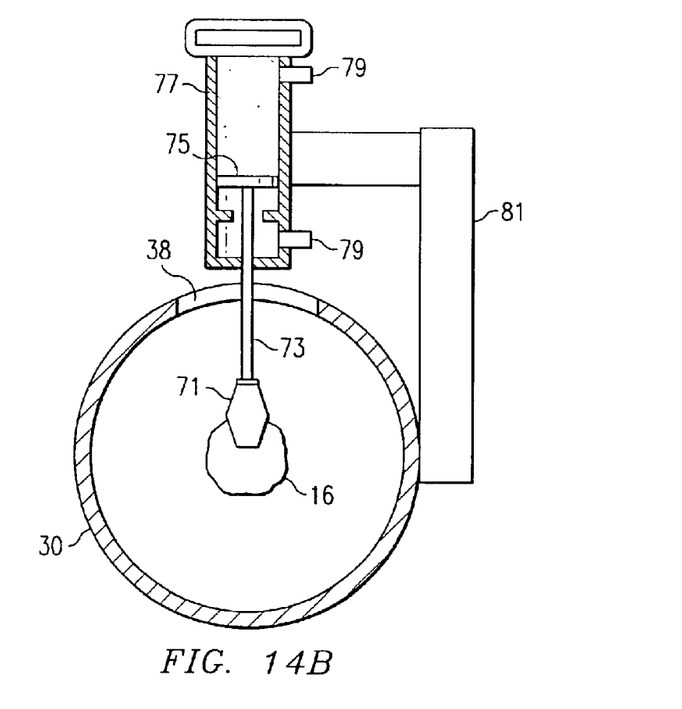

In especially harsh conditions, such as those in which the extrudate 16 is in excess of 150° F. and/or a large amount of steam is released from the expanding extrudate 16, it is desired to have as few moving parts as possible in the proximity of the containment tube 30. In this case, an alternative embodiment of the invention may be used. FIGS. 13A, 13B, 14A and 14B are illustrations of an alternative embodiment of the present invention, which contains an actuator comprising a piston 75 within a cylinder 77. Fittings 79 allow a compressor (not shown) to inject air into the cylinder 77 to move the piston 75 up or down. The piston 75 is connected to a rod 73, which is then connected to a flapper 71. Optional position indicators can be installed to indicate the actual position of the flapper 71 inside the containment tube 30, if desired. The flapper 71 in the vertically actuated flapper assembly is fixed and generally forms an angle in the range of 100° to 150° with respect to the rod 73. The vertically actuated flapper assembly is mounted on a frame 81 that is independent of the containment tube 30. In this manner, the flapper assembly can be removed and replaced without interfering with the containment tube 30 or stopping the extrusion process. FIGS. 13A and 14A show the flapper 71 positioned away from the linear extrudate 16. The flapper 71 is generally positioned away from the extrudate during start-up and shutdown of the extruder because the extrudate 16 tends to surge frequently during these periods and surging curly puff extrudate 20 tends to plug the containment tube 30 while surging linear extrudate does not. When curly puff extrudate 30 is desired, the flapper 71 is lowered through cavity 38 until it contacts the extrudate 16 (as seen in FIGS. 13B and 14B). FIGS. 13B and 14B are illustrations of the flapper 71 contacting the extrudate 16 just before the extrudate starts to curl. After the flapper 71 contacts the extrudate 16, the pressure of the flapper on the extrudate causes the extrudate 16 to curl and form curly puff extrudate 20. The flapper 71 may be repositioned as necessary to apply appropriate pressure to the curly puff extrudate 30 to control the pitch of the curly puff extrudate 30.

The vertically actuated flapper embodiment may be positioned far enough away from the containment tube 30 such that the seals or moving parts of the flapper actuator are not exposed to the harsh conditions surrounding the containment tube 30. In fact, the actuator can be located as far from the containment tube 30 as desired, provided the rod 73 is sufficiently long to reach the containment tube 30. Persons skilled in the art will be aware that employing a pair of the actuators described herein with a hinged connection between the rod 73 and the flapper 71 will produce a flapper assembly that can vary the flapper 71 orientation (i.e. the angle between the flapper 71 and the rod 73) within the containment tube 30.

It should be noted that the use of a pneumatically actuated system in each of the preceding embodiments is by way of example only. The present invention includes embodiments utilizing other compressed gasses, vacuum, or liquids such as water or hydraulic fluid. The present invention also includes other positioning devices known to those skilled in the art including electrical servo motors and mechanical screws.

It should further be understood that more than one die can be routed into a single containment tube. For example, a containment tube can receive the exit extrudate from two nearby die orifices. Further, dies producing any number of shapes, such as a star or square cross section or more complex shapes, such as a cactus or pepper shape, can be used with the invention. Moreover, the present invention is not limited to curly puff extrudate or coiled shapes. The present invention can be used in conjunction with sinusoidal and other non-linear shaped extrudate.

Any number of various types of extruders can be used with the invention, including twin screw and single screw extruders of any length and operating at a wide range of rpm. Further, while the process has been described with regard to a corn-based product, it should be understood that the invention can be used with any puffed extrudate, including products based primarily on wheat, rice, or other typical protein sources or mixes thereof. In fact, the invention could have applications in any field involving extrusion of a material that quickly goes through a glass transition stage after being extruded through a die orifice.

While the invention has been particularly shown and described with reference to a preferred embodiment, it will be understood by those skilled in the art that various changes in form and detail may be made therein without departing from the spirit and scope of the invention.

What is claimed is:

1. An apparatus for producing a puffed extrudate comprising:

a die comprising an orifice;

a containment device located in front of the orifice;

a flapper extending through a cavity in the containment device;

a pressuring device that applies a pressure to the flapper; and wherein an extrudate exits the orifice, passes through the containment device, contacts the flapper, and becomes a non-linear extrudate.

2. The apparatus of claim 1 wherein the pressuring device is a fluid pressure on one end of the flapper.

3. The apparatus of claim 2 wherein the pressuring device is a rotary actuator.

4. The apparatus of claim 2 wherein the pressuring device is an injection port located at the distal end of the flapper.

5. The apparatus of claim 2 wherein the pressuring device is an injection port located at the proximate end of the flapper.

6. The apparatus of claim 2 wherein the pressuring device is a pair of telescoping tubes located at the distal end of the flapper.

7. The apparatus of claim 2 wherein the pressuring device is a pair of telescoping tubes located at the proximate end of the flapper.

8. The apparatus of claim 2 wherein the pressuring device is a linear actuator and the flapper orientation is fixed.

9. The apparatus of claim 2 wherein the pressuring device is a linear actuator and the flapper orientation is variable.

10. The apparatus of claim 1 further comprising: a frame; wherein the pressuring device is attached to the frame and the frame is independent of the containment device.

11. The apparatus of claim 1 further comprising: a sensor; wherein the sensor indicates the pressure applied to the flapper.

12. The apparatus of claim 1 further comprising: a counterweight; wherein the counterweight acts to remove the flapper from the containment device in the absence of the pressure applied by the pressuring device to the flapper.

13. The apparatus of claim 1 wherein the pressure controls the shape of the puff extrudate.

14. A method of producing a puff extrudate comprising:

extruding an extrudate into a containment device;

contacting the extrudate with a flapper; wherein the flapper extends through a cavity in a containment device wherein a pressuring device applies a pressure to the flapper; and wherein the pressure controls the shape of the puff extrudate.

15. The method of claim 14 wherein the containment device is a tube and the extrudate is a curly puff extrudate.

16. The method of claim 14 wherein the pressuring device is a rotary actuator.

17. The method of claim 16 wherein the pressuring device is an injection port located at the distal end of the flapper.

18. The method of claim 16 wherein the pressuring device is an injection port located at the proximate end of the flapper.

19. The method of claim 16 wherein the pressuring device is a pair of telescoping tubes located at the distal end of the flapper.

20. The method of claim 16 wherein the pressuring device is a pair of telescoping tubes located at the proximate end of the flapper.

21. The method of claim 16 wherein the pressuring device is a linear actuator and the flapper orientation is fixed.

22. The method of claim 16 wherein the pressuring device is a linear actuator and the flapper orientation is variable.

23. The method of claim 14 wherein the flapper is attached to a frame and the frame is independent of the containment device.

24. The method of claim 14 wherein a sensor indicates the pressure applied to the flapper.

25. The method of claim 14 wherein a counterweight acts to remove the flapper from the containment device in the absence of the pressure applied by the pressuring device to the flapper.

* * * * *